United States Patent
Melkers et al.

(10) Patent No.: US 7,728,266 B2
(45) Date of Patent: Jun. 1, 2010

(54) EXHAUST ASSEMBLY FOR MISSILE SYSTEM, AND METHOD

(75) Inventors: Edgar R. Melkers, Tucson, AZ (US); Rudy Eisentraut, Tucson, AZ (US); Doron Strassman, Vail, AZ (US)

(73) Assignee: Raytheon Company, Waltham, MA (US)

( * ) Notice: Subject to any disclaimer, the term of this patent is extended or adjusted under 35 U.S.C. 154(b) by 893 days.

(21) Appl. No.: 11/549,223

(22) Filed: Oct. 13, 2006

(65) Prior Publication Data

US 2007/0152097 A1     Jul. 5, 2007

Related U.S. Application Data (60) Provisional application No. 60/727,135, filed on Oct. 13, 2005.

(51) Int. Cl.
    F42B 15/01       (2006.01)
(52) U.S. Cl. ...................................... 244/3.27; 244/3.24
(58) Field of Classification Search ................ 244/3.29, 244/3.27, 3.24, 3.23, 3.21, 3.28, 51, 52, 39, 244/63, 91, 99.2, 99.3; 89/1.808; 102/377, 102/378, 374; 60/230
    See application file for complete search history.

(56) References Cited

U.S. PATENT DOCUMENTS

| | | | |
|---|---|---|---|
| 3,260,205 A * | 7/1966 | Dietrich | ..................... 244/3.23 |
| 3,578,796 A | 5/1971 | Hagler et al. | |
| 4,232,843 A | 11/1980 | Clark et al. | |
| 5,806,791 A | 9/1998 | Hatalsky et al. | |
| 6,247,666 B1 | 6/2001 | Baker et al. | |
| 6,435,097 B1 * | 8/2002 | Garner et al. | ............... 102/490 |
| 6,726,147 B1 | 4/2004 | Perini et al. | |
| 2002/0130216 A1 | 9/2002 | Facciano et al. | |

FOREIGN PATENT DOCUMENTS

JP        03099198 A  *  4/1991

\* cited by examiner

*Primary Examiner*—Michael R Mansen
*Assistant Examiner*—Joshua J Michener
(74) *Attorney, Agent, or Firm*—Renner, Otto, Boisselle & Sklar, LLP (57) ABSTRACT

A system, device and method provide an exhaust assembly adapted for use with a mass ejection drive system to produce rotational torque about the principle axis of the drive system. Representative features generally include a vane suitably configured to at least partially engage a mass ejecta stream to apply a net rotational torque about the principal axis of the drive system, and a tailfin coupled to the at least one vane. The tail fin is configured to selectively deploy from an at least partially stowed position in order to decrease the application of net rotational torque about the principal axis of the drive system.

17 Claims, 7 Drawing Sheets

«EXHAUST ASSEMBLY FOR MISSILE SYSTEM, AND METHOD»

RELATED APPLICATIONS

This application claims priority to U.S. Provisional Patent Application Ser. No. 60/727,135 entitled "Integrated Tail Fin and Torque [Imparting] Rocket" filed in the United States Patent and Trademark Office on Oct. 13, 2005 by Edgar Melkers.

FIELD OF INVENTION

The present invention generally concerns mass ejection drive systems, and more particularly, representative and exemplary embodiments of the present invention generally relate to systems and methods for providing exhaust assemblies adapted for affecting torque about the deployment axis of a rocket or missile.

BACKGROUND OF INVENTION

To improve the performance of mass ejection drive systems, it is sometimes desirable to rotate the drive system about its principal axis. Conventional structures for producing rotation include fluted nozzles and ablative vanes.

Fluted nozzles are generally fixed structures that are at least partially disposed within the ejecta stream of the mass ejection drive system. These structures impart torque and affect rotation of the drive system as a result of their incidence with matter in the ejecta stream. However, because fluted nozzles are fixed and considerably durable, they generally affect rotation for substantially the entire duration of mass ejection. This poses a number of problems for drive systems configured for use with launch tubes. For mass ejection drive systems configured for deployment from a launch tube, the duration of mass ejection is likely to exceed the time that it takes for the device to exit the launch tube. As a consequence, fluted nozzles will typically continue to impart rotation to the drive system following exit from the launch tube. Additionally, because the duration of mass ejection is likely to exceed the time that it takes to exit the launch tube, maximum rotation will generally not be achieved upon exit from the launch tube, but at some subsequent point in time. These issues may operate to complicate targeting calculations and reduce predictability of the drive system with respect to targeting.

Some of the problems associated with fluted nozzles may be ameliorated with the use of ablative vanes. In general, ablative vanes may be suitably configured to provide the drive system with periods of mass ejection in which there is substantially no rotation imparted to the system. Ablative vanes may also be suitably configured to produce higher rates of accelerated rotation than fluted nozzles. However, problems with ablative vanes include irregular and unpredictable erosion of the vanes. Moreover, for drive systems configured for deployment from a launch tube, ablative vanes have a tendency to foul the launch tube by virtue of their substantially direct contact with launch tube surfaces.

SUMMARY OF THE INVENTION

In various representative aspects, the present invention corresponds to a system and method for providing an exhaust assembly for a mass ejection drive system adapted to address the deficiencies associated with the conventional art. Exemplary features generally include: a selectively engaged vane, a selectively deployed tailfin, and a shaft coupling such a vane to such a tailfin.

Advantages of the present invention will be set forth in the Detailed Description which follows and may be apparent from the Detailed Description or may be learned by practice of exemplary embodiments of the invention. Still other advantages of the invention may be realized by any of the instrumentalities, methods or combinations particularly pointed out in the claims.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the detailed description, wherein:

Elements in the figures are illustrated for simplicity and clarity and have not necessarily been drawn to scale. For example, the dimensions of some of the elements in the figures may be exaggerated relative to other elements to help improve understanding of various embodiments of the present invention. Furthermore, the term "first", "second", and the like herein, if any, are used inter alia for distinguishing between similar elements and not necessarily for describing a sequential or chronological order. Moreover, the term "front", "back", "top", "bottom", "over", "under", "forward", "aft", and the like in the description and/or in the claims, if any, are generally employed for descriptive purposes and not necessarily for comprehensively describing exclusive relative position. Any of the preceding term so used may be interchanged under appropriate circumstances such that various embodiments of the invention described herein, for example, may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventors' conception of the best mode, and are not intended to limit the scope, applicability or configuration of the invention in any way. Rather, the following description is intended to provide convenient illustrations for implementing various embodiments of the invention. As will become apparent, changes may be made in the operation and/or arrangement of any of the elements described in the disclosed exemplary embodiments without departing from the spirit and scope of the invention.

Various representative implementations of the present invention may be applied to any exhaust assembly for affecting torque about the principal axis of a mass ejection drive system. Certain representative implementations may include, for example: an exhaust assembly for affecting torque about the principal axis of a missile, which may include, for example: a rocket; a self-propelled projectile; and/or the like.

Figure 1:
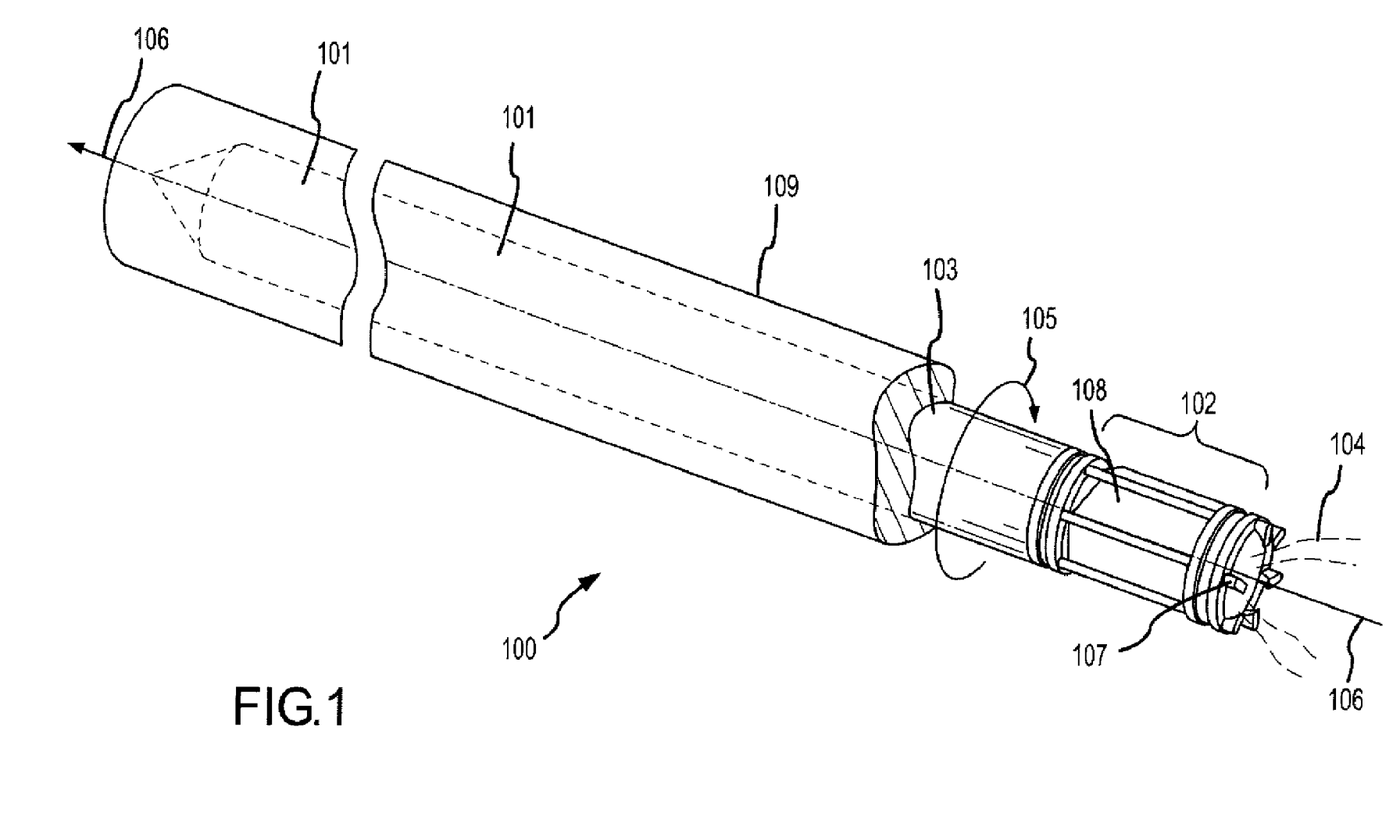
FIG. 1 representatively illustrates a missile system in accordance with an exemplary embodiment of the present invention.

FIG. 1 representatively illustrates a missile system 100 in accordance with an exemplary embodiment of the present invention. Missile system 100 may comprise a launch housing 109 and missile 101. Launch housing 109 may comprise a launch tube or similar structure suitably adapted to house, protect, stabilize, etc., one or more missiles prior to and/or during launch. Launch housing 109 may comprise a structure which is distinct from missile 101, where missile 101 is propelled by a mass ejection drive system 103. Generally, launch housing 109 may substantially concentrically conform around missile 101 and constrain translation of missile 101 to changes in position in a single dimension coincident with the principal axis 106 of the missile 101 or mass ejection drive system 103. Principal axis 106 generally corresponds to a straight line that is coincident with drive system's 103 highest order of symmetry (alternatively or conjunctively, principal axis 106 may be coincident with drive system's 103 vector of deployment), for example: a straight line joining the apex and the center of the base of a cone; a straight line passing through the center of a circle; a straight line passing through the centers of the circular faces of a cylinder, and/or the like.

Launch housing 109 may be suitably configured for re-use such that launch housing 109 generally maintains its ability to support missiles 101 through multiple mass ejection cycles of deployment. Design considerations, such as the operating temperature of ejected mass, may influence the dimensions and selection of materials for fabrication of launch housing 109. Launch housing 109 may have a shape other than that of a cylindrical tube and may be suitably configured to provide support for a variety of missile geometries. Launch housing 109 may include other features, such as structural support members, sighting mechanism, electronics, and/or the like.

Missile 101 may comprise a mass ejection drive system 103 and an exhaust assembly 102. Mass ejection drive system 103 may generally include a system for inducing propulsive motion of missile 101, where missile 101 substantially derives its propulsive drive from the emanation of mass in ejecta stream 104. Examples of such a system include a rocket engine, an ion thruster, a jet engine, and/or the like. Such a system may be generally configured to produce thrust by the ejection of at least one of flammable fluids, flammable solids, nonflammable fluids, partially flammable fluids, plasmas, and/or other ejected masses. Mass ejection drive system 103 may be suitably configured for substantial combustion of material to produce a plasma ejecta stream (e.g., as in the case of a rocket or jet engine).

Ejecta stream 104 may comprise a three dimensional region of ejected mass as ejected by drive system 103. This three dimensional region may be substantially defined by the geometry of outlet features (e.g., a constriction nozzle, an expansion nozzle, etc.) through which ejected mass passes when leaving the drive system and may be affected by the velocity, mass, volume, and/or material properties of the ejected mass, as well as the properties of the drive system design. Depending on the manner of ejection of the mass and the design of mass ejection drive system 103, ejecta stream 104 may be described as an expansive column or cone of matter emanating from the outlet of mass ejection drive system 103.

Exhaust assembly 102 may include anything that may be coupled to mass ejection drive system 103 such that the coupling generally does not render the drive system inoperable for its intended purpose. Exhaust assembly 102 may include elements coupled for the purpose of affecting the production of rotational torque of mass ejection drive system 103 about its principle axis. Torque may generally describe the moment of a force as defined by the vector product of the radius vector from the axis of rotation to the point of application of the force and the force vector. Net torque generally describes the sum of all torque forces experienced by a system. For example, exhaust assembly 102 may be suitably adapted to produce net torque 105 about the principal axis 106 of mass ejection drive system 103 and/or missile 101.

Exhaust assembly 102 may include structural elements configured for operation partially within and/or partially outside of ejecta stream 104. Exhaust assembly 102 may include structural elements configured to operate substantially independently of structure selectively configured for operation partially within ejecta stream 104, and structure configured to operate in a manner substantially dependent on structure selectively configured for operation partially outside of ejecta stream 104.

Exhaust assembly 102 may include a plurality of vanes 107. In one representative embodiment, vane 107 may comprise an element which may be configured to extend at least partially within ejecta stream 104 of mass ejection drive system 103. Vane 107 may be adjustable such that it may be at least partially engaged in ejecta stream 104 or disengaged from ejecta stream 104. Vane 107 (or a plurality of vanes) may be suitably configured to increase or decrease the application of net rotational torque 105 about principal axis 106 of mass ejection drive system 103.

Exhaust assembly 102 may further include a plurality of tailfins 108. In an exemplary and representative embodiment, tailfin 108 may comprise a structure which may be configured for stowage and deploy from exhaust assembly 102. Tailfin 108 may be suitably configured to affect a change in application of net rotational torque 105 when deployed and have a substantially minimal effect with respect to the application of net rotational torque 105 when stowed. Tailfin 108 may also be suitably configured to stow within, for example, a tailfin recess.

Figure 2:
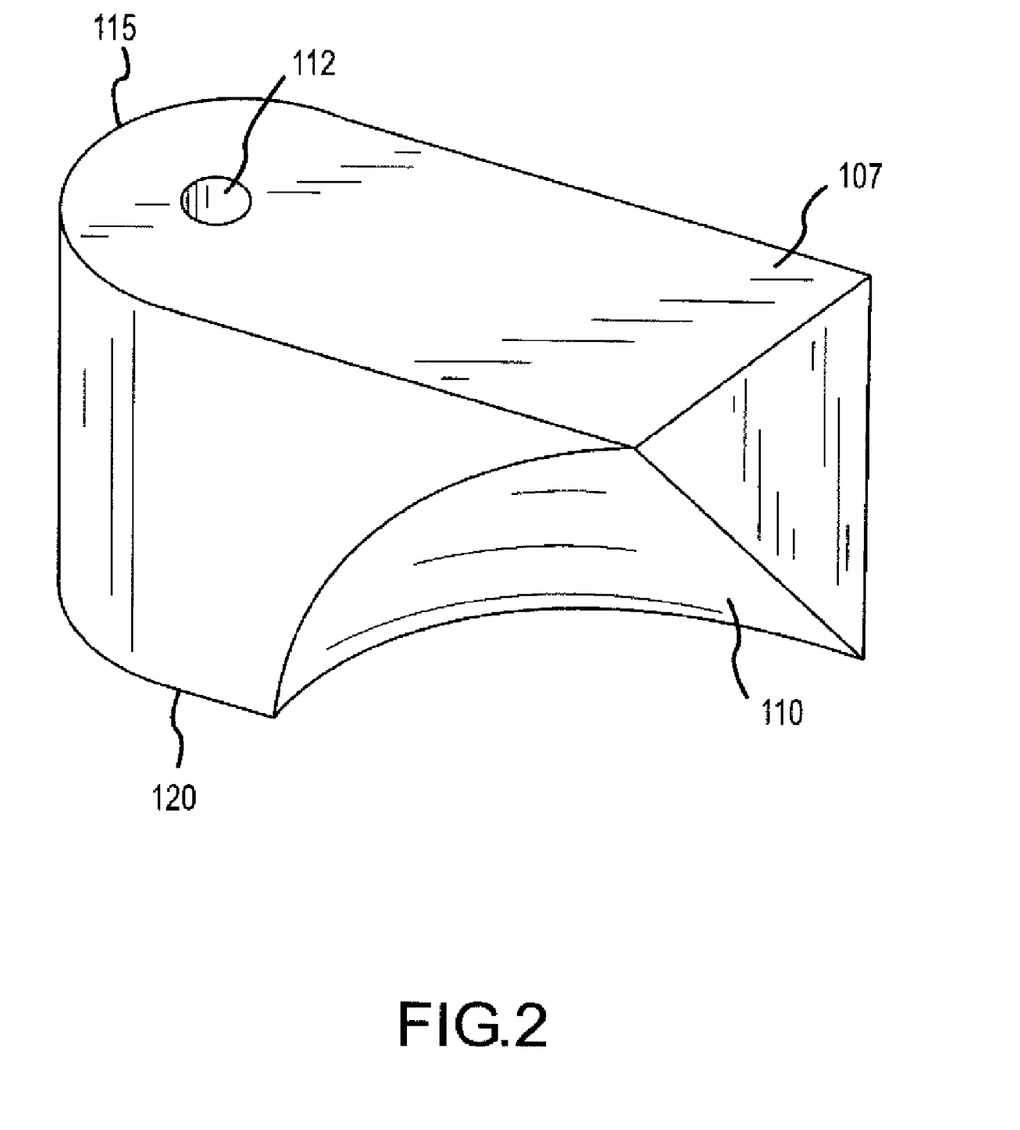
FIG. 2 representatively illustrates a exhaust nozzle vane in accordance with an exemplary embodiment of the present invention.

FIG. 2 representatively illustrates a vane 107 in accordance with an exemplary embodiment of the present invention. Vane 107 may comprise a shaft portion 112, a directional surface geometry 110 (e.g., a scoop or other suitably adapted shape that may be employed to assist vane 107 with production of net rotational torque 105), a vane recess unlock surface 115, and a vane recess lock surface 120.

In a representatively and exemplary embodiment, vane 107 may be dimensionally configured for coupling to mass ejection drive system 103 in order to selectively at least partially extend into ejecta stream 104. Vane 107 may also be substantially configured to substantially withstand multiple engagement cycles within ejecta stream 104. The properties of ejecta stream 104 (and the properties of the environment of the mass ejection drive system 103 more generally) will affect material selection for fabrication of vane 107. Optional materials may include, for example, composites, metal alloys, polymers, stainless steel, titanium, and/or other materials, whether now known or otherwise hereafter described in the arts of metallurgy, ceramics, composites, and/or material science.

Shaft portion 112 may be dimensionally configured for attachment to a shaft or a plurality of shafts in order to operationally couple vane 107 to other elements of exhaust assembly 102. Because vane 107 may be suitably configured to rotate about the principal axis of a coupled shaft, translate along the principal axis of a coupled shaft, or both rotate about and translate along the principal axis of a coupled shaft, a variety of geometries may be employed within shaft portion 112. While vane 107 in the embodiment representatively depicted in FIG. 2, includes shaft portion 112 extending through the vane; shaft portion 112 may be alternatively, conjunctively or sequentially configured to extend partially through vane 107 or to protrude from vane 107. Design considerations, such as the operating environment of vane 107, the shaft or shafts to which vane 107 may be coupled, the dynamics of vane 107 in operation, and the desired durability of shaft portion 112 will generally influence the design of shaft portion 112.

Directional surface geometry 110 (in the embodiment representatively depicted in FIG. 2) may be defined by a curvilinear section where two edges of the section comprise conic segments and one edge of the section comprises a line. The specific dimensions of the section may include segments of planar and conic sections, multiple conic sections, and/or the like. The section may also extend to more than three sides (and/or more than one surface) of vane 107. Directional surface 110 may further comprise additional surface features, topologies and/or geometries.

In the embodiment representatively illustrated in FIG. 2, surface 110 may be angled such that when vane 107 is engaged in ejecta stream 104, the ejected mass incident on directional surface 110 of vane 107 produces a force normal to the region of directional surface 110 of vane 107 at the locus of ejecta impact. This force is transferred to the remaining portion of vane 107 by the structure of vane 107, and may be further transferred to other support/structural elements of exhaust assembly 102. Directional surface 110 may be configured to produce a torque by virtue of the force imparted by ejecta stream 104 on vane 107. Vane 107 may be configured so that this torque operates to rotate missile 101 about its principal axis. This rotation may be in a clockwise direction or in a counterclockwise direction, depending on the surface geometry of vane 107.

Vane recess unlock surface 115 (in the representatively disclosed embodiment) may be suitably configured for operation within a suitably configured vane recess. Specifically, the disclosed geometry substantially allows for rotation about the principal axis of a coupled shaft of vane 107 within a suitably configured portion of a vane recess. The curvature of vane recess unlock surface 115 substantially corresponds to the curvature of the suitably configured portion of the vane recess.

Vane recess lock surface 120 (in the representatively embodiment disclosed herein) may be suitably configured for operation within a suitably configured vane recess. Specifically, such geometry may be suitably adapted to substantially prevent rotation about the principal axis of a coupled shaft of vane 107 within a suitably configured portion of a vane recess. The geometry of vane recess lock surface 120 may substantially correspond to the geometry of a suitably configured portion of the vane recess.

While the embodiment generally depicted in FIG. 2 includes features relating to locking and unlocking of vane 107, locking and unlocking of vane 107 is not necessarily required for all embodiments of the disclose exhaust system assembly. In alternative embodiments, for example, vane 107 may be suitably configured to be substantially free of rotational constraint except for those constraints applied by the coupled shaft. Such applied constraints may include torques applied on the shaft acting to counter torque otherwise imparted on vane 107.

While the representatively disclosed embodiment includes a directional surface geometry 110 defined by the section of an otherwise substantially parallelepiped structure, other embodiments in accordance with the present invention may define surface feature(s) differently. For example, directional surface geometry 110 may be defined as an angled portion of vane 107 substantially canted with respect to incidence of ejecta stream 104. Alternatively, rather than a substantially parallelepiped structure, vane 107 may be defined as the combination of shaft portion 112 and a substantially angled structure, such as that of an airfoil or wing-shaped structure, and/or the like. Vane 107 may include hollow regions or regions where material is eliminated to reduce the mass of vane 107.

Figure 3:
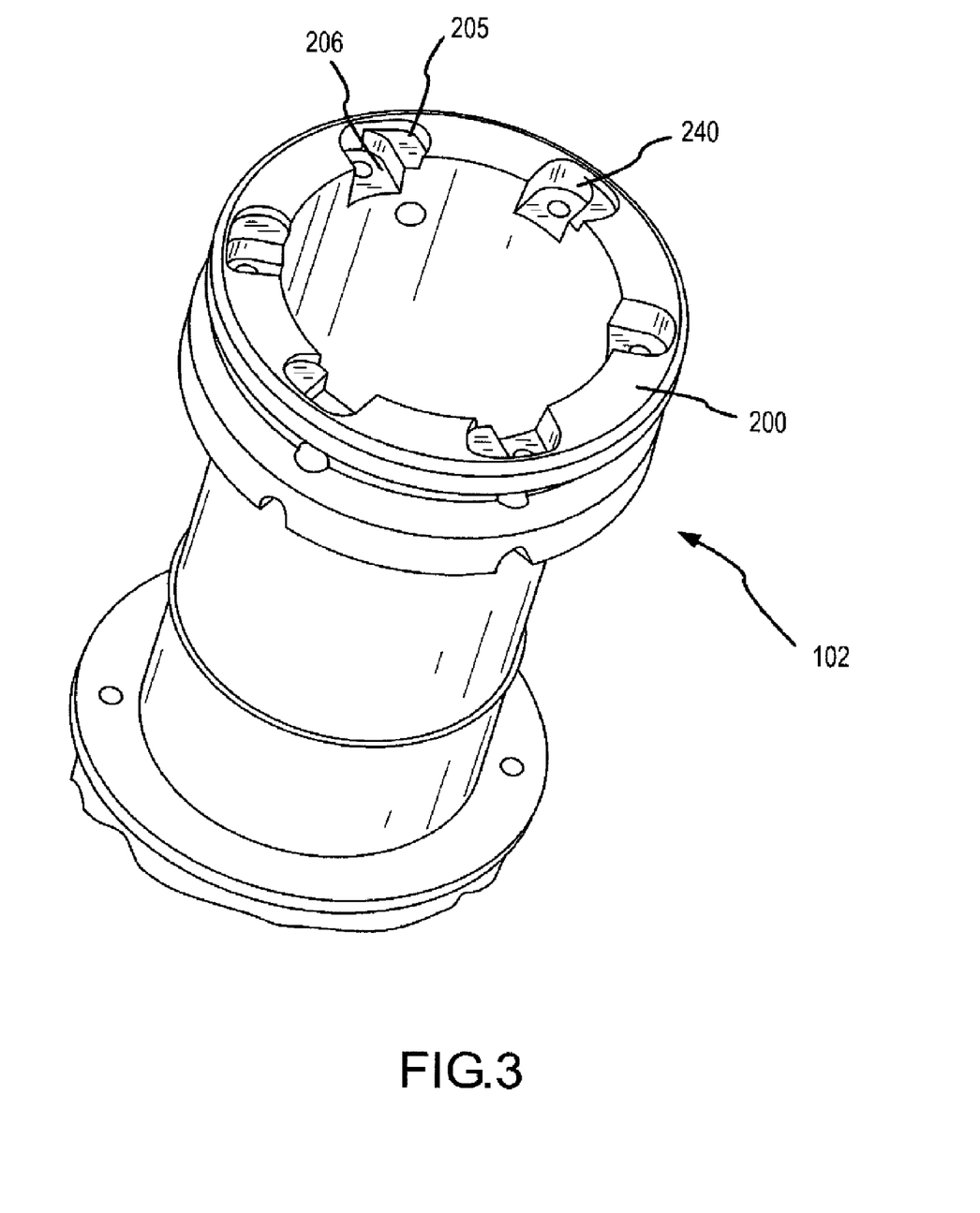
FIG. 3 representatively illustrates a portion of an exhaust assembly in accordance with an exemplary embodiment of the present invention.

FIG. 3 representatively illustrates a portion of exhaust assembly 102 in accordance with an exemplary embodiment of the present invention. Exhaust assembly 102 may include a housing manifold 200 with any number of vane recesses 240. Housing manifold 200 comprises that portion exhaust assembly 102 that couples each vane 107 to the drive system. Housing manifold 200 may additionally be suitably configured to substantially reduce heat transfer between the ejecta stream 104 and other elements of mass ejection drive system 103. Housing manifold 200 may comprise a suitably configured portion of the larger exhaust assembly 102 or a distinct piece which may be coupled to exhaust assembly 102 and/or the mass ejection drive system 103.

In one embodiment, vane recess 240 may comprise a surface feature of exhaust assembly 102 that allows for locking and/or unlocking of a vane. The term "lock" and the term "unlock" are intended to be complementary descriptions for the rotational disposition of a vane about the principal axis of the shaft to which the vane is coupled. When a vane is "locked", it is substantially positioned in a region of vane recess 240 where further rotation of a vane with respect to rotations about the principal axis of a shaft coupled to the vane is not permitted or otherwise substantially impaired. When a vane is "unlocked", it is substantially positioned in a region of vane recess 240 where further rotation of a vane with respect to rotations about the principal axis of a shaft coupled to the vane is permitted or otherwise not substantially impaired. Vane recess 240 may be suitably configured to lock and allow for unlocking with respect to a particular design of a vane.

In one representative embodiment, each vane recess 240 may have an unlock seat surface 205 and a lock seat surface 206. In the exemplary embodiment generally depicted in FIG. 3, vane recess 240 includes an unlock seat surface 205 near the rear outer face of housing manifold 200, with a lock seat surface 206 below and further away from the outer face of the housing manifold 200. In an alternative embodiment, the lock seat surface 206 may be closer to the outer face of housing manifold 200 than the unlock seat surface 205.

Unlock seat surface 205 of each vane recess 240 may be suitably configured to allow for rotation of each vane about a principal axis of a shaft that is coupled to the vane. Unlock seat surface 205 may be suitably configured to allow a portion of the vane to disengage to a position where a portion of the disengaged vane is below the outermost surface of housing manifold 200. Alternatively, conjunctively or sequentially, unlock seat surface 205 may be suitably configured to allow substantially the entire vane to disengage to a position where effectively no portion of the disengaged vane is disposed below the outermost surface of housing manifold 200.

Lock seat surface 206 of the vane recess may be suitably configured to substantially constrain the rotation of each vane about a principal axis of a shaft that is coupled to the vane. Lock seat surface 206 may be suitably configured to substantially allow a portion of the vane to engage to a position where a portion of the engaged vane falls below the outermost surface of housing manifold 200.

In a representative embodiment, a vane may move between engagement with the unlock seat surface 205 and the lock seat surface 206 by translation along the principal axis of a shaft coupling the vane to the housing manifold 200. While the representatively disclosed embodiment includes a vane recess 240, the present invention does not require such a feature. Various alternative embodiments may optionally omit a vane recess 240 for some or all vanes, or may include a vane recess for less than all of the vanes.

Figure 4:
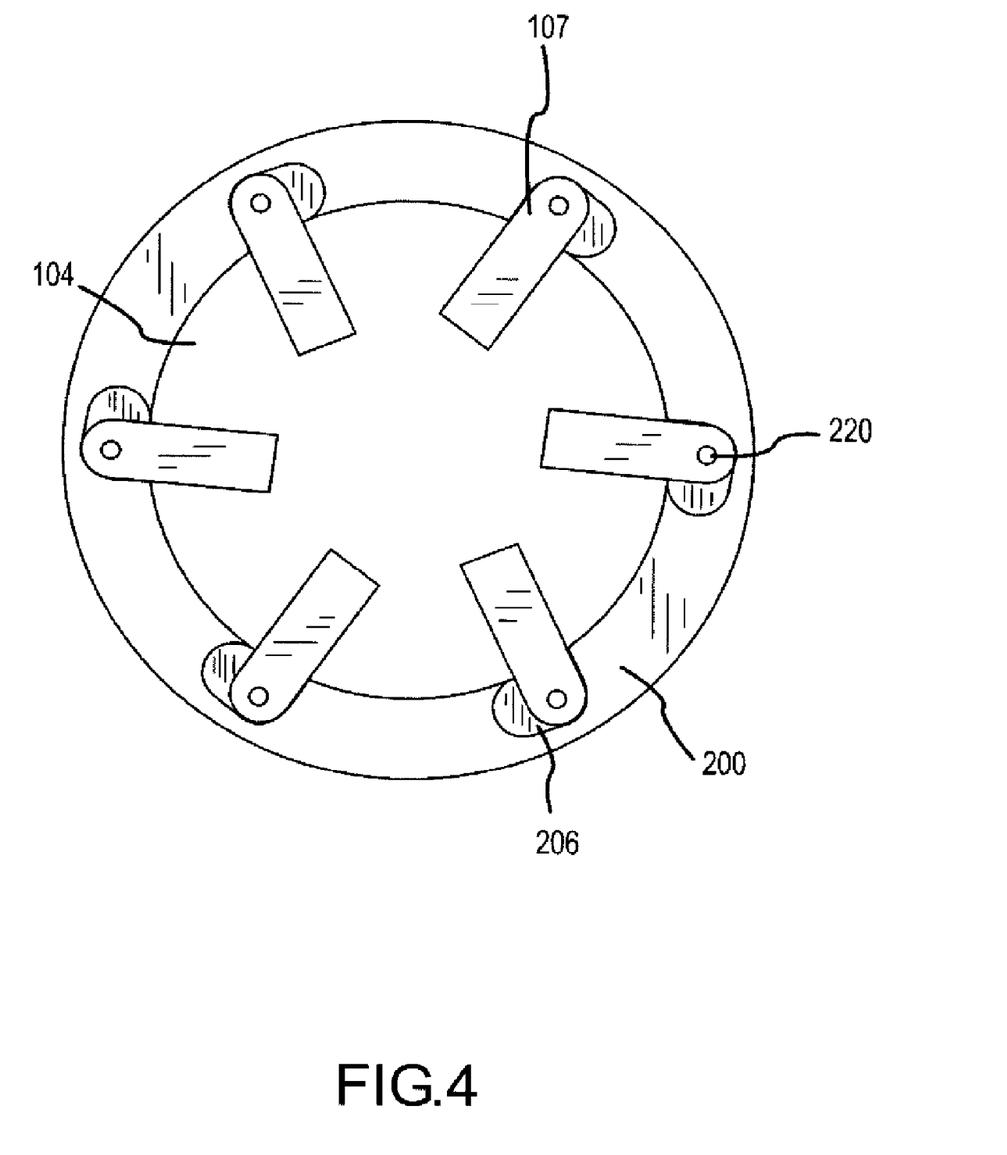
FIG. 4 representatively illustrates a plurality of engaged vanes in accordance with an exemplary embodiment of the present invention.

FIG. 4 representatively illustrates a plurality of locked, engaged vanes in accordance with an exemplary embodiment of the present invention. The term "engage" is generally intended to denote the disposition of a vane 107 where vane 107 at least partially intrudes into ejecta stream 104, with the position of maximum intrusion into ejecta stream 104 referred to as "engaged". The term "disengage" is generally intended to denote the disposition of a vane 107 where vane 107 does not substantially intrude into ejecta stream 104, with the maximum non-intrusion into ejecta stream 104 termed "disengaged".

Each vane 107 may be coupled to housing manifold 200 of mass ejection drive system by operation of shaft 220. Each locked, engaged vane 107 in the representatively disclosed embodiment may be configured with vane recess lock portion 120 substantially intermeshed to lock seat surface 206. Further, vane 107 may be configured to be unlocked and positioned within unlock seat surface 205 of the vane recess. Vanes 107 are locked in an engaged position, and as such, the vanes at least partially intrude into ejecta stream 104 of the mass ejection drive system 103. Ejecta stream 104, in the representatively disclosed embodiment, may be constrained or otherwise shaped by the circular cross section of housing manifold 200, as well as by intrusion of engaged vanes 107.

At least one shaft 220 may be coupled to each vane 107 by way of shaft portion 112 of vane 107. In the simplest case, a single shaft 220 may be attached to a tailfin and vane 107. In this case, rotations of a tailfin about the principal axis of an attached shaft 220 result in corresponding rotations of vane 107 (and vice versa). Additionally, longitudinal translation of a tailfin corresponding to longitudinal translation of shaft 220 along its principal axis causes consequent longitudinal translation of vane 107. As discussed above, unlock seat surface 205 of each vane recess 240 may be suitably configured to allow for rotation of each vane 107 about the principal axis of shaft 220 that is coupled to vane 107.

In a representative embodiment, shaft 220 may comprise a cylindrical bar that may be configured to couple one element of the system to another element of the system. Shaft 220 may be coupled such that elements rotate about the principal axis of shaft 220. Also, shaft 220 may be coupled such that elements translate in accordance with translations of shaft 220 along its principal axis. Shaft 220 may comprise, for example, a bolt, a nail, a pin, a rod, a screw, a solenoid, and/or the like.

Figure 5:
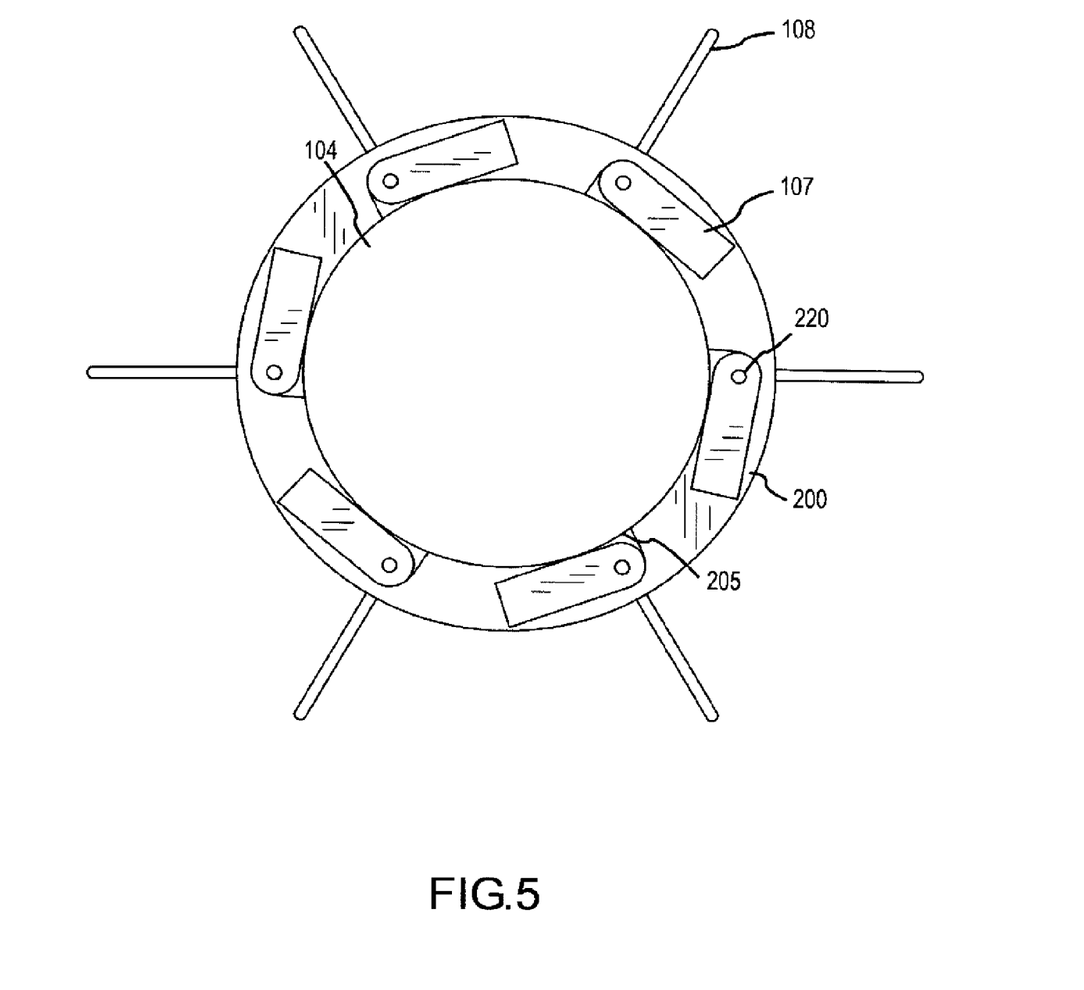
FIG. 5 representatively illustrates a plurality of disengaged vanes and a plurality of deployed tailfins in accordance with an exemplary embodiment of the present invention.

FIG. 5 representatively illustrates a plurality of unlocked, disengaged vanes 107 and a plurality of deployed tailfins 108 in accordance with an exemplary embodiment of the present invention. Vanes 107 may be coupled to housing manifold 200 of exhaust assembly 102 by way of shaft 220. In such an embodiment, an unlocked, disengaged vane 107 may be configured to be locked and positioned within the lock seat surface 206 of the vane recess, as representatively illustrated, for example, in FIG. 4. Vanes 107 may be disengaged, and as such at least partially disposed outside of ejecta stream 104 of the mass drive system.

In a representative embodiment, a substantially unitary tailfin 108 may be discretely coupled to one vane 107 such that there is, for example, a one-to-one correspondence between the rotations of each tailfin 108 about shaft 220 coupling each tailfin 108 to each vane 107. Further, a substantially unitary tailfin 108 may be discretely coupled to one vane 107 such that there is a one-to-one correspondence between the longitudinal translation of each tailfin 108 along the principal axis of the shaft 220 coupling each tailfin 108 to each vane 107.

Other embodiments may include more complicated arrangements to exploit features and/or properties of various other mechanical linkages between tailfin 108 and vane 107. For example, an arrangement of shafts may couple a tailfin 108 to a vane 107 in such a way that rotation of coupled tailfin 108 about the principal axis of shaft 220 corresponds to a smaller magnitude of rotation of the coupled vane 107 about the principal axis of the shaft 220, as with the inclusion, for example, of a differential gear. By way of further example, an arrangement of shafts may couple a tailfin 108 to a vane 107 in such a way that rotation of the coupled tailfin 108 about the principal axis of the shaft 220 corresponds to both rotation of the coupled vane 107 about the principal axis of the shaft 220 as well as longitudinal translation of the vane 107 along the shaft 220 coupled to the vane 107, as with the inclusion of a suitably configured differential gear and screw gear or worm drive. These examples are not intended to be exhaustive, but rather they illustrate representative alternative, conjunctive and/or sequential options for coupling vane 107 to tailfin 108 such that rotation or translation of tailfin 108 may be suitably configured to correspond to rotation and/or translation of vane 107 in a variety of ways utilizing a variety of mechanisms.

Figure 6:
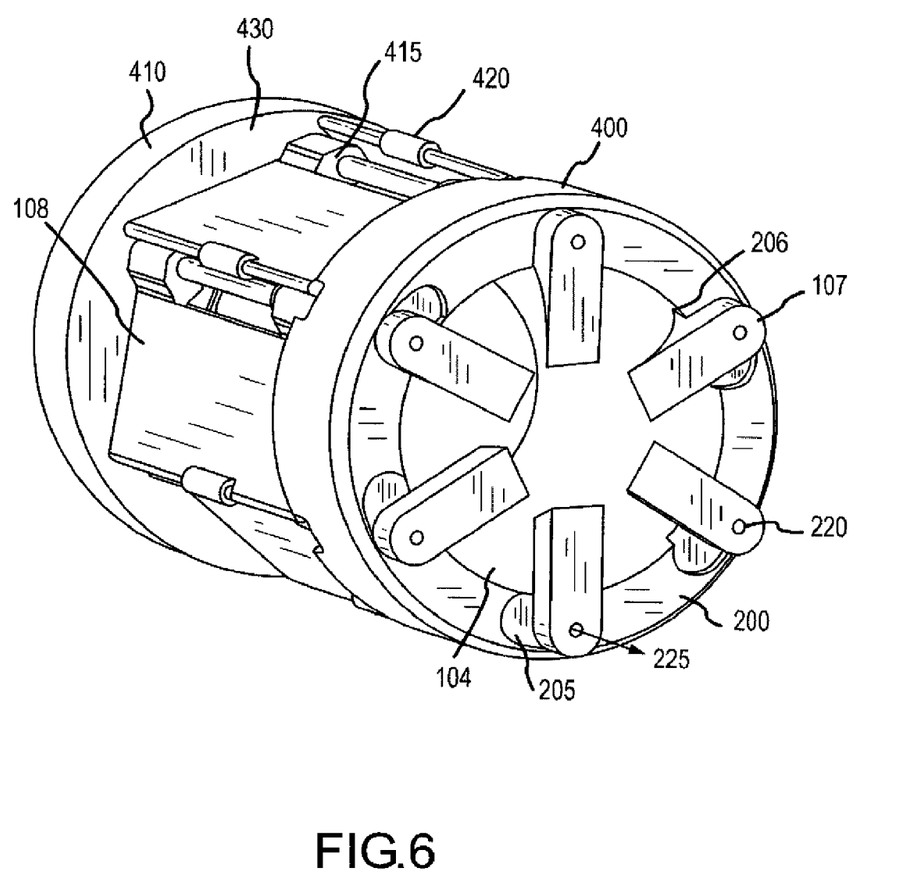
FIG. 6 representatively illustrates a plurality of engaged vanes and a plurality of stowed tailfins in accordance with an exemplary embodiment of the present invention.

FIG. 6 representatively illustrates a plurality of locked engaged vanes 107 and a plurality of stowed tailfins 108 in accordance with an exemplary embodiment of the present invention. "Stow" may generally refer to a change in position of a tailfin 108 where the tail fin 108 is increasingly more substantially flush with the surface of a structure to which the tailfin 108 is coupled, with the nadir of stowage termed "stowed". "Deploy" may generally refer to a change in position of a tailfin 108 where the tailfin 108 is increasingly less substantially flush with the surface to which it is coupled, with the zenith of deployment termed "deployed". The terms "deployed" and "stowed" are intended to describe complementary movements of a tailfin 108. As representative examples, where a tailfin 108 is being "deployed," it shall be understood to be transitioning from a substantially "stowed" position; where a tailfin 108 is being "stowed," it shall be understood to be transitioning from a substantially "deployed" position.

Vane 107 may be discretely coupled to housing manifold 200 of mass ejection drive system 103 by way of shaft 220. A locked engaged vane 107 may be positioned within the lock seat surface 206 of a vane recess, and may be further configured for disposition within the unlock seat surface 205 of a vane recess.

The longitudinal dimension 400 of housing manifold 200 may provide manifold structure and material sufficient to couple housing manifold 200 to shaft 220 such that that shaft 220 may be substantially constrained to rotations about (and longitudinal translation along) the principal axis 225 of shaft 220. Tailfin 108 may be at least partially stowed within tailfin recess 430. Tailfin recess 430 may comprise a surface feature of exhaust assembly 102 where the outer surface of a stowed tailfin 108 is substantially flush with the outer surface of the exhaust assembly 102. Tailfin recess 430 may comprise an area of substantially reduced circumference forming an indentation, and may be a region of the otherwise substantially cylindrical exhaust assembly 102 where the outer radius is less than the maximum outer radius.

Tailfin recess 430 may be suitably configured such that a surface of each stowed tailfin 108 may be substantially flush with the outer surface of mass ejection drive system 103 and/or exhaust assembly unit 102. Tailfin recess 430 may be suitably configured to reduce the rotational affect of each stowed tailfin 108 with respect to the principal axis 106 of mass ejection drive system 103. Tailfin recess 430 may also be suitably configured to reduce the friction on missile 101 as between a stowed tailfin 108 and the inner wall of launch housing 109. While representatively disclosed embodiments include a tailfin recess 430, the exhaust assembly 102 may be suitably configured to exclude such a feature.

Shaft 220 may be coupled to housing bearing 415 within tailfin recess 430. Housing bearing 415 may be suitably configured to substantially constrain movements of shaft 220 with respect to rotation about and longitudinal translation along the principal axis 225 of coupled shaft 220 as substantially constrained by housing bearing 415.

Housing bearing 415 may include any structure or material that operates to reduce the coefficient of friction as between two surfaces. Exemplary structures include a roller bearing, a ball bearing, a gasket, and/or the like. Exemplary materials include grease, a polymer coating, a metal alloy coating, a composite coating, and/or the like.

In a representative embodiment, housing bearing 415 may couple tailfin 108 to housing 410 of the mass ejection drive system. Housing bearing 415 may substantially couple to tailfin 108 itself or may be suitably configured to couple to shaft 220, which further couples to tailfin 108. Housing bearing 415 may be suitably configured to constrain rotation of tailfin 108 to rotations about the principal axis 225 of shaft 220 coupling tailfin 108 to housing bearing 415. Housing bearing 415 may be suitably configured to constrain longitudinal translation of tailfin 108 to longitudinal translation along the principal axis 225 of shaft 220 coupling tailfin 108 to housing bearing 415. Housing bearing 415 may be suitably configured to constrain both rotation about and longitudinal translation along the principal axis 225 of shaft 220 coupling tailfin 108 to housing bearing 415. Housing bearing 415 may be a distinct piece further coupled to housing 410. Housing bearing 415 may comprise a feature of housing 410, or housing bearing 415 may comprise a distinct piece further coupled to tailfin recess 430. Housing bearing 415 may further comprise a substantially integrated feature of manufacture of tailfin recess 430.

The longitudinal dimension 400 of housing manifold 200 may be suitably configured to provide lateral support for coupling each shaft 220 to housing manifold 200. The longitudinal dimension 400 may also serve to protect various shaft 220 configurations such that movements of a tailfin 108 correspond to various movements of each vane 107. For example, the longitudinal dimension 400 may be suitably configured to provide housing manifold 200 structure to protect a differential gear coupling two shafts, one shaft coupled to a tailfin 108 and another shaft 220 coupled to a vane 107. As another example, the longitudinal dimension 400 may be suitably configured to provide housing manifold 200 structure to protect a screw gear or worm drive coupling two shafts, one shaft coupled to a tailfin 108 and another shaft 220 coupled to a vane 107. Protection of various shaft 220 configurations may be employed for specific operational environments, such as passage through gases or fluids at high velocity or passage through extreme temperatures.

Housing 410 of mass ejection drive system 103 may extend from tailfin recess 430 and serve to couple remaining portions of mass ejection drive system 103 to exhaust assembly unit 102. Housing 410 may be suitably configured to support the internal drive mechanisms of mass ejection drive system 103. Housing 410 may be suitably configured to enhance the aerodynamics of mass ejection drive system 103. Housing 410 may be further suitably configured to couple an exhaust assembly 102 to mass ejection drive system 103. Housing 410 may comprise various materials including aluminum, composites, iron, metal alloys, nickel, organic material, polymers, stainless steel, titanium, and combinations thereof. Housing 410 may also be suitably dimensionally configured to house or otherwise protect various mass ejection drive sub-systems for operation in various environments.

Tailfin bearing 420 may be coupled to each tailfin such that tailfin bearing 420, rather than a portion of tailfin 108, is suitably configured to come into contact with the inner wall of launch housing 109. Tailfin bearing 420 may be suitably configured to substantially prevent gouging of the launch housing 109 wall as by incidence with tailfin 108 during missile deployment. Tailfin bearing 420 may be suitably configured to substantially reduce aberrant behavior of mass ejection drive system 103 arising from incidence between tailfin 108 and launch housing 109.

Tailfin bearing 420 may include any structure or material (whether now known or otherwise hereafter described in the art) that may be adapted to reduce the coefficient of friction as between two surfaces. Exemplary structures include a roller bearing, a ball bearing, a gasket, and/or the like. Representative substances may include grease, a polymer coating, a metal alloy coating, a composite coating, and/or the like. While the representatively disclosed embodiment generally includes a tailfin bearing 420, the exhaust assembly unit 102 may be suitably configured to exclude such a feature.

In a representative embodiment, tailfin 108 may be configured to deploy in, for example, a counter-clockwise direction from the perspective of an observer facing the outlet of mass ejection drive system 103. Also in such an embodiment, vane 107 may be configured to disengage through longitudinal translation of the vane along coupled shaft 220. Upon sufficient longitudinal translation, vane 107 rotates in a counter-clockwise fashion into the unlock seat surface 205 of housing manifold 200. In such an embodiment, the longitudinal translation of vane 107 may arise from deployment of tailfin 108 upon leaving launch housing 109. Other embodiments may be suitably configured to deploy tailfin 108 in a clockwise direction from the perspective of an observer facing the outlet of mass ejection drive system 103. Other embodiments may also rotate vane 107 in a clockwise fashion into the unlock seat surface 205 of housing manifold 200.

Figure 7:
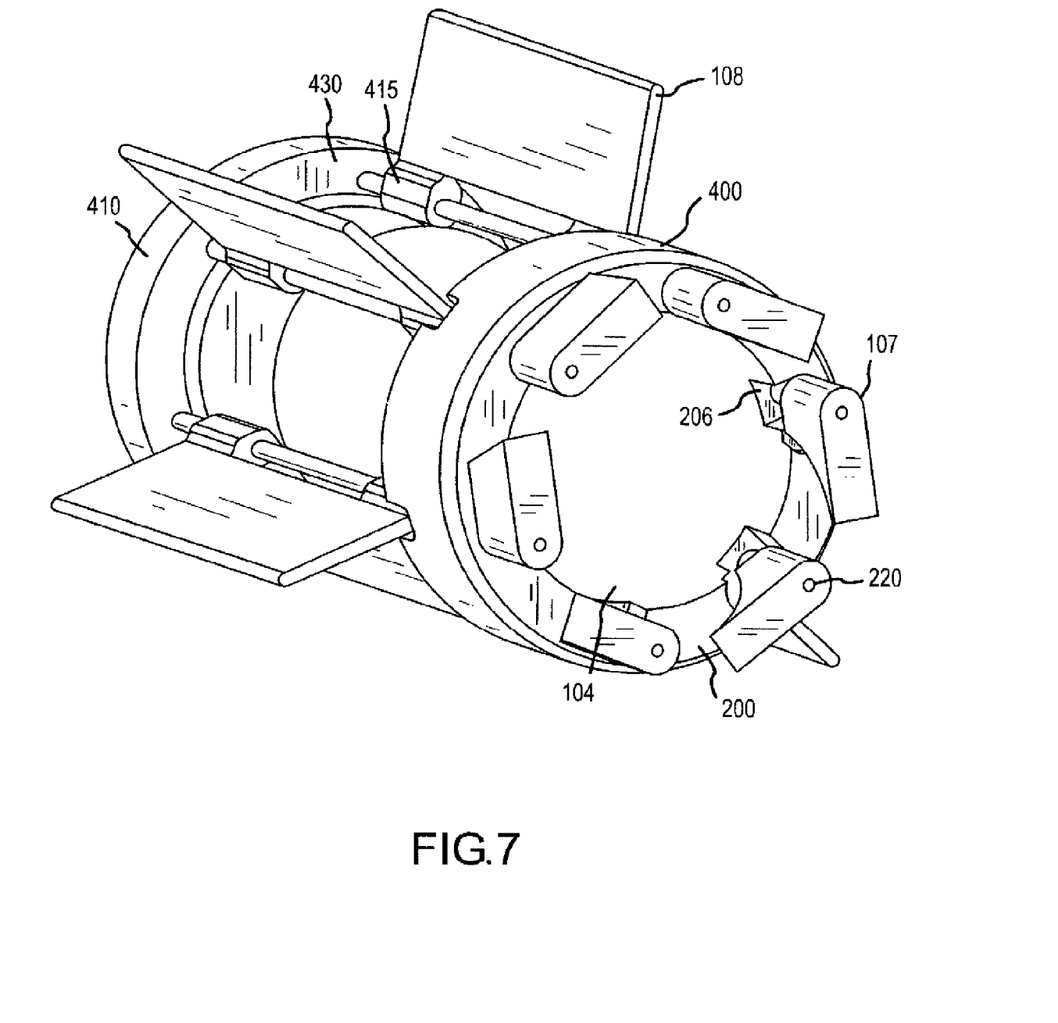
FIG. 7 representatively illustrates a plurality of disengaged vanes and a plurality of deployed tailfins in accordance with an exemplary embodiment of the present invention.

FIG. 7 representatively illustrates a plurality of unlocked disengaged vanes 107 and a plurality of deployed tailfins 108 in accordance with an exemplary embodiment of the present invention. Vane 107 may be coupled to housing manifold 200 of exhaust assembly 102 by way of shaft 220. Each unlocked disengaged vane 107 may be positioned within the unlock seat surface 205 and may be further configured to be positioned within the lock seat surface 206 of vane recess 240. Additionally, the unlocked disengaged vane 107 may be disposed at least partially outside of ejecta stream 104. Also in such an embodiment, each tailfin 108 may be at least partially deployed from tailfin recess 430. Each shaft 220 may be further coupled to housing bearing 415 within tailfin recess 430. Housing bearings 415 may be suitably configured to constrain movements of each shaft 220 to rotation and longitudinal translation along the principal axis of the coupled shaft within housing bearing 415. Housing 410 of mass ejection drive system 103 generally extends from tailfin recess 430 and serves to couple the remaining portion of mass ejection drive system 103 to exhaust assembly 102.

Vane 107 may be unlocked and disengaged in response to deployment of tailfin 108. Deployment of a tailfin 108 may be suitably configured to coincide with longitudinal translation of vane 107 along the principal axis of a shaft coupled to vane 107. This longitudinal translation may be suitably configured such that vane 107 is unlocked and may rotate into the unlock seat surface 205 of a vane recess. Rotation of vane 107 with respect to the principal axis of a shaft coupled to vane 107 may be caused by intrusion of vane 107 into ejecta stream 104 while vane 107 is in an unlocked, engaged position. Rotation of vane 107 with respect to the principal axis of a shaft coupled to vane 107 may alternatively be caused by virtue of the coupling between vane 107 and the shaft to which vane 107 is coupled.

Tailfin 108 may be deployed as a result of aerodynamic interaction of the tailfins with gases or fluids through which missile 101 passes upon deployment from launch housing 109. Tailfin 108 may also be deployed as a result of the rotation of mass ejection drive system 103 upon exit from launch housing 109. Tailfin 108 may also be deployed as a result of, for example, a spring mechanism coupled to shaft 220, further coupled to tailfin 108. Tailfin 108 may be deployed as a result of at least one of, for example, aerodynamic interaction, rotation, and spring mechanisms. Tailfin 108 may be substantially fixed in a stowed position by the internal wall of launch housing 109.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the term "comprising", "having", "including" or any contextual variant thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. An exhaust assembly for producing rotational torque about a principal axis of a mass ejection drive system, said exhaust assembly comprising:
   a plurality of vanes suitably configured to at least partially intrude into a ejecta stream produced by the mass ejection drive system in order to produce rotational torque about the principal axis of the mass ejection drive system;
   said vanes configured to selectively disengage intrusion into said ejecta stream in order to substantially cease production of torque forces about the principal axis of the mass ejection drive system;
   a plurality of tailfins operatively coupled to the vanes, wherein said tailfins are suitably configured to selectively deploy from at least partially stowed positions in response to dispositional intrusion of said vanes with respect to said ejecta stream; and
   a housing having a vane recess suitably configured to receive one of the vanes, to lock the one vane in a position that at least partially engages the ejecta stream, and further suitably configured to allow unlocking and rotation of the one vane so that the one vane at least partially disengages from the ejecta stream.

2. The exhaust assembly of claim 1, wherein at least partial deployment of said tailfins at least partially disengages the vanes from intrusion in the ejecta stream.

3. The exhaust assembly of claim 1, further comprising a bearing coupled to one of the tailfins, wherein the bearing is suitably configured to reduce friction between the one tailfin disposed in an at least partially stowed position and a launch housing.

4. The exhaust assembly of claim 1, further comprising a shaft suitably configured to operatively couple one of the tailfins to one of the vanes.

5. The exhaust assembly of claim 4, wherein the shaft is suitably configured to rotate the one vane about the principal axis of the shaft in accordance with rotational disposition of the one tailfin about the principal axis of the shaft.

6. The exhaust assembly of claim 1, further comprising a tailfin recess suitably configured for stowage of one of the tailfins and is further suitably configured to allow rotational deployment of the one tailfin.

7. An exhaust assembly for producing rotational torque about a principal axis of a mass ejection drive system, said exhaust assembly comprising:
   a plurality of vanes suitably configured to at least partially intrude into a ejecta stream produced by the mass ejection drive system in order to produce rotational torque about the principal axis of the mass ejection drive system;
   said vanes configured to selectively disengage intrusion into said ejecta stream in order to substantially cease production of torque forces about the principal axis of the mass ejection drive system;

a plurality of tailfins operatively coupled to the vanes, wherein said tailfins are suitably configured to selectively deploy from at least partially stowed positions in response to dispositional intrusion of said vanes with respect to said ejecta stream; and a shaft suitably configured to operatively couple one of the tailfins to one of the vanes;

wherein the shaft is suitably configured for longitudinal translation to longitudinally translate the one vane with respect to the principal axis of the mass ejection drive system in accordance with corresponding longitudinal translation of the one tailfin.

8. A method to produce rotational torque about a principal axis of a mass ejection drive system, said method comprising:

providing a plurality of vanes suitably configured to at least partially intrude into an ejecta stream produced by the mass ejection drive system in order to produce rotational torque about the principal axis of the mass ejection drive system; wherein said vanes are configured to selectively disengage intrusion into said ejecta stream in order to substantially cease production of torque forces about the principal axis of the mass ejection drive system;

providing a plurality of tailfins operatively coupled to the vanes, wherein said tailfins are suitably configured to selectively deploy from at least partially stowed positions in response to dispositional intrusion of said vanes with respect to said ejecta stream;

providing a housing that includes vane recesses receiving the vanes in them; and generating the eject stream with the vanes at least partially intruding into the ejecta stream; and wherein the providing the vane recesses includes providing the vane recesses configured to lock the vanes in a position that at least partially engages the ejecta stream, and further suitably configured to allow unlocking and rotation of the vanes so that the vanes at least partially disengage from the ejecta stream.

9. The method of claim 8, further comprising the step of at least partially deploying the tailfins with attendant at least partial disengagement of the vanes from the ejecta stream.

10. The method of claim 8, further comprising the step of providing a bearing coupled to one of the tailfins, wherein the bearing is suitably configured to reduce friction between the one tailfin in an at least partially stowed position and a launch housing.

11. The method of claim 8, further comprising the step of providing a shaft for operatively coupling one of the tailfins to one of the vanes.

12. The method of claim 11, further comprising:

unlocking the shaft and at least partially disengaging the one vane from the ejecta stream in accordance with rotational disposition of the one tailfin about a principal axis of the shaft.

13. The method of claim 8, further comprising the step of providing a tailfin recess suitably configured to stow the one tailfin and is further suitably configured to allow rotational deployment of the one tailfin.

14. A missile having an exhaust assembly coupled to a mass ejection drive system, said exhaust assembly comprising:

a plurality of vanes suitably configured to at least partially intrude into an ejecta stream produced by the mass ejection drive system in order to produce rotational torque about a principal axis of the mass ejection drive system;

said vanes configured to selectively disengage intrusion into said ejecta stream in order to substantially cease production of torque forces about the principal axis of the mass ejection drive system; and a plurality of tailfins operatively coupled to the vanes, wherein said tailfins are suitably configured to selectively deploy from at least partially stowed positions in response to dispositional intrusion of said vanes with respect to said ejecta stream; and a housing that includes vane recesses configured to receive the vanes and to lock the vanes in a position that at least partially engages the ejecta stream, and further suitably configured to allow unlocking and rotation of the one vane so that the one vane at least partially disengages from the ejecta stream.

15. The missile of claim 14, wherein at least partial deployment of the tailfins at least partially disengages the vanes from the ejecta stream.

16. A missile having an exhaust assembly coupled to a mass ejection drive system, said exhaust assembly comprising:

a plurality of vanes suitably configured to at least partially intrude into an ejecta stream produced by the mass ejection drive system in order to produce rotational torque about a principal axis of the mass ejection drive system;

said vanes configured to selectively disengage intrusion into said ejecta stream in order to substantially cease production of torque forces about the principal axis of the mass ejection drive system;

a plurality of tailfins operatively coupled to the vanes, wherein said tailfins are suitably configured to selectively deploy from at least partially stowed positions in response to dispositional intrusion of said vanes with respect to said ejecta stream; and a shaft suitably configured to operatively couple one of the tailfins to one of the vanes, wherein the shaft is suitably configured to rotate the one vane about a principal axis of the shaft in accordance with rotational disposition of the one tailfin about the principal axis of the shaft, and wherein the shaft is suitably configured for longitudinal translation to longitudinally translate the one vane with respect to the principal axis of the mass ejection drive system in accordance with corresponding longitudinal translation of the one tailfin.

17. The missile of claim 16, further comprising a housing with a vane recess suitably configured to lock the one vane so that the one vane at least partially engages the ejecta stream and is further suitably configured to allow unlocking and rotation of the one vane about the principal axis of the shaft so that the one vane at least partially disengages from the ejecta stream.

* * * * *